Feb. 15, 1955 — J. P. JARBOE — 2,701,916
DENTAL SALIVA EJECTOR
Filed Oct. 13, 1953
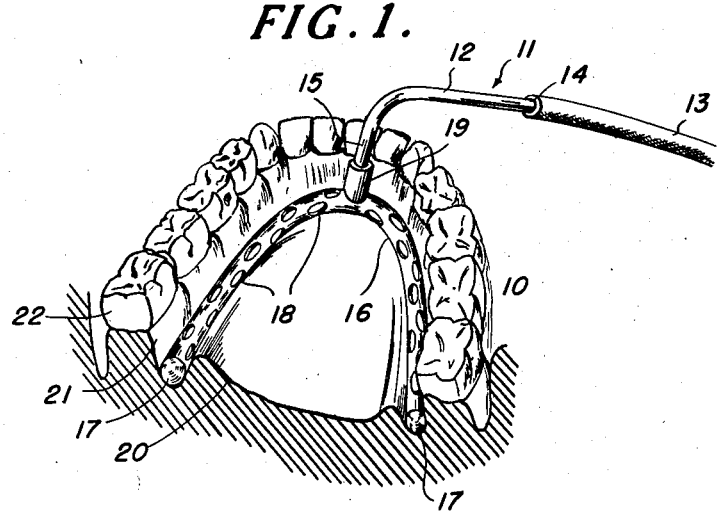
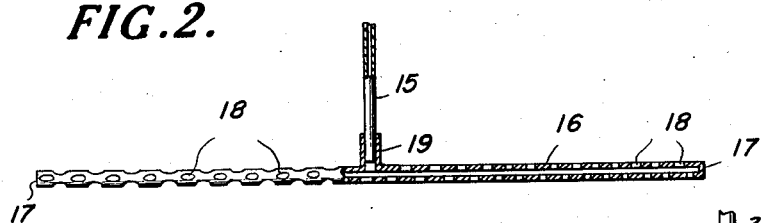
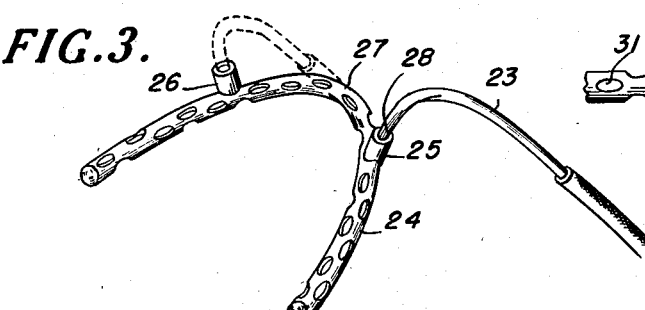
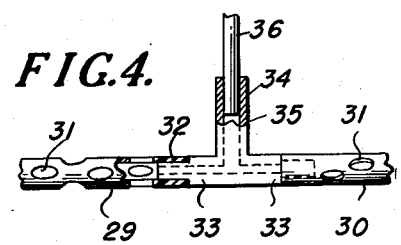
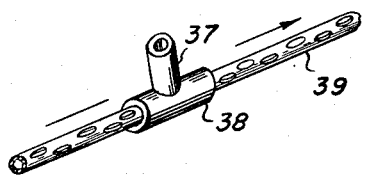
INVENTOR
John P. Jarboe
BY
ATTORNEYS

United States Patent Office 2,701,916
Patented Feb. 15, 1955

2,701,916

DENTAL SALIVA EJECTOR

John P. Jarboe, Washington, D. C.

Application October 13, 1953, Serial No. 385,780

5 Claims. (Cl. 32—33)

The present invention relates to a saliva ejector for withdrawing saliva from the mouth during dental treatment.

Heretofore, it has been the practice to provide a saliva ejector in the form of a rigid tube which rests against the lower lip of the patient and has an inlet nozzle provided with openings on one side for withdrawing the saliva. Due to the partial vacuum created in the tube, there is a tendency to draw the adjacent tissues against the side of the inlet nozzle to close these openings and thus interfere with the efficient operation of the ejector. Moreover, such ejectors are of fixed shape so that they cannot be adjusted to fit mouths of different sizes and shapes.

Accordingly, an important object is to provide a simple, efficient, compact, and economical saliva ejector having a resilient flexible perforated tubular portion arranged to completely fit any size or shape mouth so as to insure the efficient removal of the saliva during dental treatment.

A further object consists in detachably connecting a flexible perforated tubular member to the shank of a saliva ejector in such a manner that the tubular member may be positioned comfortably within the mouth and be connected to the shank without interfering with the area being treated by the dentist.

Another object comprehends a provision of a saliva ejector including a metal tubular stem or shank having an upper hooked end portion arranged to engage the lower lip and having resilient flexible perforated tubular member connected thereto intermediate its ends. The flexible tubular member communicates with the hooked portion of the stem so that in operation the perforations or openings therein are placed in such a position that some of these openings cover the soft tissue of the mouth that is drawn into these openings by the suction created by the aspirator. Thus, means are provided for stabilizing the flexible tubular member, and which also insures the openings not covered by the tissue being exposed to efficiently withdraw the saliva from the mouth. The flexible tubular portion of the ejector may be of any length or size and when inserted does not gouge the mouth tissues or cause discomfort. Further, it will not gag the patient or produce nausea when inserted into the mouth.

Other objects and advantages of the invention will become apparent from the following description when taken in conjunction with the accompanying claims and drawings.

Referring to the drawings wherein is shown several preferred embodiments the invention may assume:

Figure 1 is a perspective view of the lower jaw of the mouth showing my improved flexible saliva ejector associated therewith;

Figure 2 is a detailed plan view with parts in section of the flexible tube shown in its normal straight or horizontal position;

Figure 3 is a detailed perspective view of a modified form of the flexible ejector;

Figure 4 is a detailed view with parts in section of a modified form of the invention; and Figure 5 is a detailed perspective view of a modified form of connection for the flexible tubular member.

Referring to the drawings, 10 indicates the lower jaw of a patient to be treated by a dentist, and 11 a saliva ejector constructed in accordance with the present invention. The ejector 11 comprises the usually metal tubular straight stem or shank 12 which at one end is connected to a suction hose or the like 13 as at 14. The opposite end of the stem is bent outwardly and downwardly to form the hook portion 15 so as to extend into the mouth and engage the lower lip. A flexible, resilient, one-piece, tubular member formed of any suitable durable material such as plastic or the like 16, normally assumes a straight or horizontal position as shown in Figure 2, and has its ends closed as at 17 and is provided with a plurality of openings or holes 18 spaced from each other and extending around and longitudinally of the member. Intermediate its end, the perforated tubular member 16 is provided with a lateral nipple 19 into which extends the outer end of the hook portion 15 of the stem 12 so as to establish communication of the tubular stem with the interior of the tubular member 16 in order to withdraw saliva secreted in the mouth.

The flexible tubular member 16 is of such length as to cover a large area of the mouth when inserted therein, and rest on the tissues of the lower jaw 20 under the tongue adjacent the inner gum 21 and below the teeth 22 (Fig. 1) so as to be positioned near the glands that secrete the saliva. It will be seen that due to the flexibility and resiliency of the tubular member 16, it may readily be bent from its horizontal position as shown in Fig. 2 to fit the contour of the mouth and lay under the tongue adjacent the gum as shown in Figure 1, and away from the teeth and out of the working area being treated. As the tube 16 is detachably connected to the stem 12, it may be easily removed to be cleaned or sterilized.

In the modified form of the invention shown in Figure 3, the shank 23 of the ejector is similar in construction to the form previously described and the tubular flexible portion 24 thereof is shown provided with spaced nipples 25 and 26 offset from the center portion 27 of the tubular member and arranged selectively to be detachably connected to the outer end of the hook portion 28 of the shank 23. Thus, the shank 23 may be connected to the perforated tube 24 without obstructing the area being treated.

Instead of forming the flexible tubular member in one piece such as shown in Figure 2, for sanitary reasons it may be made of two separate sections 29 and 30 (Fig. 4), each of which sections has the openings or holes 31 for providing perforated portions arranged to be detachably connected to the reduced tubular ends 32 of the horizontal arms 33 of the T-shaped fitting 34. The vertical arm 35 of the fitting is connected to the hook portion 36 of a saliva ejector in substantially the same manner as the hook portion 15 previously described. Thus, it will be seen that each of the tubular sections 29 and 30 may be detachably connected to the fitting 35 and be thrown away after each use.

In the modified form of the invention shown in Figure 5, there is provided a substantially T-shaped tubular fitting 37 having a horizontal portion 38 of such diameter as to slidably receive a flexible, resilient, perforated tubular member 39 similar in construction to the member 16. The fitting 37 is detachably connected to the hook portion of an ejector such as 15 previously described and is slidable longitudinally on the tubular member 39 so as to be moved to different adjusted positions in order not to interfere with the dentist when treating the teeth of a patient.

Thus, it will be seen that a flexible, resilient, perforated tubular member is provided for efficiently withdrawing saliva from the mouth of a patient being treated and which may be adjusted to conform to any size and shape of mouth. Additionally, the flexible tubular member is detachably connected to a shank portion of the ejector in such a manner that the flexible tubular portion may be comfortably positioned within the mouth without danger of the shank portion interfering with the dentist when working on teeth either in the front or sides of the mouth. For sanitary purposes the flexible tubular member may be formed in sections which are detachably connected to the shank by a suitable fitting, so that when once used they may be replaced by new clean sections at a minimum expenditure of time and effort.

It will be understood that the forms of the invention

I claim:

1. A saliva ejector including a tubular stem having a hooked end portion, a resilient, perforated tubular member extending transversely of the stem, and means communicating an intermediate portion of the tubular member to said hooked end portion, said resilient member normally being straight and arranged to be bent and inserted into the mouth so as to rest on the lower jaw adjacent the gum in order to be comfortably positioned near the glands that secrete the saliva.

2. A saliva ejector including a rigid tubular stem having a hooked portion at one end arranged to engage the lower lip, a resilient flexible perforated tubular member extending transversely of said stem, means for connecting an intermediate portion of the tubular member to said hook portion for communicating the interior of the tubular member with said tubular stem, said tubular member having closed ends and arranged normally to assume a horizontal straight position and when inserted in the mouth to rest against the lower jaw adjacent the gums so as to fit near the glands that secrete the saliva in order to withdraw the same from the mouth.

3. A saliva ejector as called for in claim 2 in which the tubular member is formed of separate sections, and means are provided for detachably connecting the sections to the stem so that the sections when used may be replaced by new sections.

4. A saliva ejector as called for in claim 2 in which the tubular member is provided with longitudinally spaced outwardly extending nipples arranged to be detachably connected to the hook portion of the stem so as to permit convenient access to the front teeth when the ejector is positioned within the mouth of the patient.

5. A saliva ejector as called for in claim 2 in which the means for connecting the tubular member to the hook portion is adjustably mounted on the tubular member.

References Cited in the file of this patent

UNITED STATES PATENTS

| | | |
|---|---|---|
| 1,053,965 | Barghausen et al. | Feb. 25, 1913 |
| 2,504,557 | Lumian | Apr. 18, 1950 |